US007968647B2

(12) United States Patent
Gan

(10) Patent No.: US 7,968,647 B2
(45) Date of Patent: Jun. 28, 2011

(54) ENVIRONMENTALLY FRIENDLY NATURAL OIL-BASED TONER RESIN

(75) Inventor: Seng Neon Gan, Kuala Lumpur (MY)

(73) Assignees: Universiti Malaya (MY); Jadi Imaging Technologies SDN BHD (MY)

( * ) Notice: Subject to any disclaimer, the term of this patent is extended or adjusted under 35 U.S.C. 154(b) by 0 days.

(21) Appl. No.: 12/667,847

(22) PCT Filed: Jun. 13, 2008

(86) PCT No.: PCT/MY2008/000056
§ 371 (c)(1), (2), (4) Date: Jan. 5, 2010

(87) PCT Pub. No.: WO2009/005335
PCT Pub. Date: Jan. 8, 2009

(65) Prior Publication Data

US 2011/0021720 A1 Jan. 27, 2011

(30) Foreign Application Priority Data

Jul. 5, 2007 (MY) .............................. PI 20071079

(51) Int. Cl.
*C08L 67/00* (2006.01)

(52) U.S. Cl. ........ 525/168; 525/123; 525/165; 525/174; 525/418; 525/419; 525/437; 525/440.01; 525/440.16; 525/445

(58) Field of Classification Search ................. 525/123, 525/165, 168, 174, 418, 419, 437, 440.01, 525/440.16, 445
See application file for complete search history.

(56) References Cited

U.S. PATENT DOCUMENTS

| | | | | |
|---|---|---|---|---|
| 5,376,494 | A | 12/1994 | Mahabadi et al. | |
| 2003/0040554 | A1 * | 2/2003 | Nakanishi et al. | 523/221 |
| 2005/0064313 | A1 * | 3/2005 | Kishiki et al. | 430/109.2 |
| 2007/0020549 | A1 | 1/2007 | Koyama et al. | |
| 2007/0026336 | A1 | 2/2007 | Yamazaki et al. | |
| 2007/0072107 | A1 | 3/2007 | Cheong et al. | |

FOREIGN PATENT DOCUMENTS

| | | | |
|---|---|---|---|
| JP | 61112160 | A | 5/1986 |
| JP | 7098517 | A | 4/1995 |
| JP | 9034163 | A | 2/1997 |
| JP | 9034174 | A | 2/1997 |

* cited by examiner

*Primary Examiner* — David Wu
*Assistant Examiner* — Robert Jones
(74) *Attorney, Agent, or Firm* — Dicke, Billig & Czaja, PLLC

(57) ABSTRACT

A method of synthesizing polyester toner resins comprises: polycondensing polycarboxylic acids, polyols and free fatty acids to form low molecular weight polyester resins with alkenyl group or hydroxyl group or a combination of both; wherein at least one of said polycarboxylic acids, said polyols or said free fatty acids derive from natural oils; crosslinking the polyester via alkenyl group with radical initiator and vinyl monomer or via hydroxyl group with diisocyanate to generate polyester of higher molecular weight and melting point; obtaining a first fraction with a molecular weight ranged between 3000 and 15000 and a second fraction with a molecular weight larger than 15000; and combining said first fraction with said second fraction to form said polyester toner resins.

18 Claims, No Drawings

ENVIRONMENTALLY FRIENDLY NATURAL OIL-BASED TONER RESIN

CROSS-REFERENCE TO RELATED APPLICATIONS

This Utility Patent Application claims the benefit of the filing date Malaysia Application No. PI20071079, filed Jul. 5, 2007, and International Application No. PCT/MY2008/000056, filed on Jun. 13, 2008, both of which are herein incorporated by reference.

FIELD OF INVENTION

The present invention relates to a method of synthesizing toner resins for laserjet and photocopy machines and the product synthesized thereof. More particularly, the present invention discloses a method of synthesizing polyester resins with high content of natural materials by polycondensation reaction between polycarboxylic acids and polyols derive from natural oils. The polyester resins are then treated under controlled conditions to produce two different molecular weight fractions which can be combined to achieve the required properties of toner resins.

BACKGROUND OF THE INVENTION

Toner is a fine, polymer-based powder which is used to form texts and images on the printed paper by electrophotographic technology. It is generally electrically charged or possessing magnetic properties. It is widely used in laser printers, photocopiers and fax devices, which are based on electrophotographic technology invented more than 30 years ago. Toner starts off as a powder, and passes through these electrophotographic machines being heated to a fluid and ends up as a solid as it is cooled down and bonded to the printed paper.

An electrophotographic process generally involves steps of utilizing a photoconductive material, forming an electrostatic latent image on a photosensitive member by using various means, exposing light onto the document with texts or images, followed by developing the latent texts or images with toners to produce visible texts or images, then transferring the toners onto a transferring material such as paper and fixing the toners onto the transfer material by using heat, pressure or the like to provide a copied article.

We can illustrate the usage of toners via the operation of a photocopy machine which uses electric charges to transfer an image to a plain piece of paper. The document to be copied is placed face down on the platen and illuminated by a lamp. Its image is directed to an electrical charged metal electrostatic drum by light reflection using mirrors. Where light strikes the drum, the white areas of the document become conductive and therefore discharge to ground, but that dark areas remain charged. Opposite charged toner particles are applied onto the drum and these particles stick only to the charged areas. The image on the drum is then transferred to a piece of paper. A heater is used to seal the toner by melting it onto the paper.

The toner resins will give toner its overall physical ability to be first a fine powder, then melt at a suitable temperature, then form a permanent plastic solid capable of bonding to the paper. The majority of toners are manufactured using a melt mixing process. The color in the toner comes from the pigment blended into the polymer particles while they are being made.

The conventional toner is made by compounding the ingredients, such as resins, pigment, magnetic iron oxides, waxes and charge control agents by melting and blending the ingredients to form a paste. This mixture is then cooled by extruding onto a cooling belt into thin plate. The raw toner is then pulverized and ground into a fine powder within a controlled particle size range by jet mills or air-swept hammer mills. This process resulted in toner granules of various sizes and jagged shapes when viewed under a microscope.

The over-size and under-size toner particles are sieved out in a 1 to 3 pass process. The pulverized powder is then blended with additives to adjust flow and electrostatic properties. This final blending is critical and difficult to control, especially when the additives particle size is much different from the required toner particle size.

Today, various companies are using chemical process to produce toner particles so as to get a finer print. As a result, toner particles of more uniform sizes and shapes are produced. The finer and more uniform shapes enable more accurate color reproduction and more efficient toner use.

Currently there are two main types of conventional toner resins: (i) styrene-acrylate copolymer produced by radical initiated addition polymerization, and (ii) polyester resin by stepwise condensation polymerization. The raw materials involved are petroleum-based chemicals. While styrene-acrylate copolymers are made from monomers such as styrene, butyl acrylate and acrylic acid, which are derived from petrochemicals; the polyester toner resins are also synthesized from petrochemicals such as ethylene glycol, 1,4-butandiol or other polyol in combination with polyfuctional acids such as phthalic anhydride, adipic acid, isophthalic acid, and sebacic acid.

Toner formulations vary from manufacturer to manufacturer and different toners are produced to suit different machines. The toner resins described in the prior arts include a wide range of variation in their producing method and product quality.

There is a dry process color toner described by the Japanese Pat. No. JP61112160 to Takayama, issued in 1986. This yellow toner is obtained by incorporating an azomethine oil-soluble dye into a synthetic resin, natural resin, rubber or wax. This incorporation prevents the toner from being opaque by the secondary aggregate of a color material as well as from having a hiding effect in the stage of superposing multiple colors and to eliminate the deterioration of electrostatic chargeability.

Another Japanese Pat. No. JP9034174 to Ishida, issued in 1997, also discusses an invention relating to the toner for electrostatic-charge image development, its manufacture approach and the image formation approach for developing an electrostatic latent image. The main component of this toner is a polyester binder resin, which is incorporated with coloring agent and release agent. The advantages of this toner is capable of providing a good fixing property and blocking resistance as well as controlling the dielectric loss tangent to a specific value.

U.S. Pat. No. US2007020549 to Koyama, published in 2007 relates to a method of manufacturing a polymerized toner which is a composites made from a polyester resin and a styrene-acrylate copolymer resin. This toner has an excellent fixability at low temperature in an image forming process, fine-line reproducibility and easy productivity. The invention also discusses a product of toner manufactured by said method, and an image forming method.

Another U.S. Pat. No. US2007/0026336A1 to Katsuhisa, published in 2007, describes an invention of a toner including a binder resin and a colorant which also enables low temperature fixation irrespective of the constitution of a fixing unit.

The toner also stably provides high image quality even when the toner is used at a high humidity or a low humidity.

Still another U.S. Pat. No. US20070072107A1 to Cheong, published in 2007 relates to a different method of synthesizing a toner having a core formed of a polyester resin and a colorant, wherein the core is encapsulated with a macromonomer and/or a reactive emulsifying agent as well as a polymerizable monomer resin.

Since toner resin is being applied in various types of electrophotographic devices in recent years, there has been higher demand of toner resins. Seeing the existing toner resins are mostly made from petrochemicals which are derived from the non-renewable resources, which are non-sustainable, the synthesis of polyester toner resins with high content of natural material is desirable. More specifically, the synthesis of palm oil-based polyester resins, which could be easily converted to toner resins through a controlled crosslinking process, is an environmental friendly approach as compared to the conventional resins made from petrochemicals.

SUMMARY OF INVENTION

The primary object of the invention is to provide a novel method to produce toner resins derive from various vegetable oils or animal fats. The vegetable oils may include palm oil, coconut oil, soy oil, linseed oil, castor oil or any combination thereof. The animal fats may include tallow, fish oil or the combination thereof.

Another object of the invention is to provide a natural oil-based low molecular weight polyester with various active sites such as —OH and —C═C— which allow for specific crosslinking reactions for the chemical modification to achieve a final product with two different molecular weight fractions so that it can attain the required performance of a toner resin, with respect to the good fixing and offset properties.

At least one of the preceding objects is met, in whole or in part, by the present invention, in which one of the embodiments of the present invention describes a method of synthesizing polyester toner resins comprises: a) polycondensing polycarboxylic acids, polyols and free fatty acids to form polyester resins with alkenyl groups; wherein at least one of said polycarboxylic acids, said polyols or said free fatty acids derive from natural oils; b) mixing said polyester resins with vinyl monomers to form a mixture; c) crosslinking said mixture with crosslinking agents to obtain a first fraction with a molecular weight ranged between 3000 and 15000; d) crosslinking said mixture with a second dose of crosslinking agents to obtain a second fraction with a molecular weight larger than 15000; and e) combining said first fraction with said second fraction to form said polyester toner resins.

Another embodiment of the present invention is a method of synthesizing polyester toner resins comprises: a) polycondensing polycarboxylic acids, polyols and free fatty acids to form polyester resins with hydroxyl group; wherein at least one of said polycarboxylic acids, said polyols or said free fatty acids derive from natural oils; b) crosslinking first portion of said polyester resins with diisocyanate compounds to obtain a first fraction with a molecular weight ranged between 3000 and 15000; c) crosslinking second portion of said polyester resins with a higher dose of diisocyanate compounds to obtain a second fraction with a molecular weight greater than 15000; and d) combining said first fraction with said second fraction to form said polyester toner resins.

Still another embodiment of the invention is a toner resin synthesized by any of the methods described. The toner resins of the present invention have many advantages over the traditional toners when a high content of natural materials are used as raw materials. For example, toner resins of the present invention are having lower impact to the environment, since it is made of mostly natural materials. In view of the requirements to environmental protection regulations in many countries the toner industries worldwide are looking for replacements of petroleum-based chemicals with more environmental friendly materials, preferable made from sustainable resources.

This invention also makes the product more competitive on the international market since most of the raw materials used derive from natural origin and help in reducing cost.

One skilled in the art will readily appreciate that the present invention is well adapted to carry out the objects and obtain the ends and advantages mentioned, as well as those inherent therein. The embodiments described herein are not intended as limitations on the scope of the invention.

DETAILED DESCRIPTION OF THE INVENTION

Hereinafter, the invention shall be described according to the preferred embodiments of the present invention and by referring to the accompanying description. However, it is to be understood that limiting the description to the preferred embodiments of the invention is merely to facilitate discussion of the present invention and it is envisioned that those skilled in the art may devise various modifications without departing from the scope of the appended claim.

In one of the preferred embodiment, the present invention discloses a method of synthesizing polyester toner resins comprises: a) polycondensing polycarboxylic acids, polyols and free fatty acids to form polyester resins with alkenyl groups; wherein at least one of said polycarboxylic acids, said polyols or said free fatty acids derive from natural oils; b) mixing said polyester resins with vinyl monomers to form a mixture; c) crosslinking said mixture with crosslinking agents to obtain a first fraction with a molecular weight ranged between 3000 and 15000; d) crosslinking said mixture with a second dose of crosslinking agents to obtain a second fraction with a molecular weight larger than 15000; and e) combining said first fraction with said second fraction to form said polyester toner resins.

The initial step of the present invention is a polycondensation reaction between a polycarboxylic acid and a polyol. The formation of polyester resin is based on the condensation reaction of a hydroxyl group with a carboxylic group as represented by the reaction below:

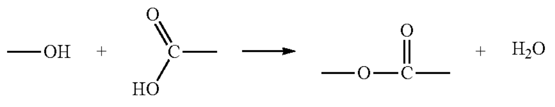

According to the preferred embodiment, at least one of the polycarboxylic acids, polyols or free fatty acids used in the present invention is derived from natural oils. In the present invention, the polycarboxylic acids that derive from natural oils include azelaic acid, citric acid, fumaric acid, maleic anhydride and any combination thereof. Besides, the polycarboxylic acids that derive from petrochemicals can also be used, which include adipic acid, isophthalic acid, sebacic acid, phthalic anhydride or any combination thereof. According to the preferred embodiment, the polycarboxylic acids used should preferably contain a fraction of unsaturated dicarboxylic acids such as the fumaric acid or maleic anhydride so as to obtain polyester resins with high amount of alkenyl group (C=C) in the structure of the polyester chain. Excess dosage of fumaric acid or maleic anhydride would generate excessive amount of alkenyl group, and render the polyester unstable and prone to formation of gel.

The polyols used in the present invention are selected from the group consisting of glycerol, ethylene glycol, 1,4-butandiol and any combination thereof. Glycerol is obtained from vegetable oils and animal fat, whereas ethylene glycol and 1,4-butandiol are petrochemicals. In one of the preferred embodiments, the free fatty acids used in the present invention are selected from the group consisting of capric acid, lauric acid, oleic acid, palmitic acid, stearic acid, linoleic acid, linolenic acid, maleic anhydride or any combination thereof.

The term natural oils discussed herein include both the vegetable oils and animal fats as well as their derivatives. According to the preferred embodiment of the present invention, the vegetable oils and their derivatives are selected from the group consisting of palm oil, coconut oil, soy oil, linseed oil, castor oil, rapeseed oil and any combination thereof; whereas the animal fats and their derivatives are selected from the group consisting of tallow oil, fish oil and the combination thereof. In the preferred embodiment, the natural oils which are preferably to be used as the main raw materials for the present invention are palm oil and its derivatives. The preferable palm oil or its derivatives would include the palm oil, palm olein, palm stearin and palm kernel oil.

The present invention makes use of natural oils for the synthesis of a useful polyester toner resin. In the present invention, high content of natural materials is employed for the synthesis of these environmental friendly natural oil-based polyester toner resins, whereby the amount of natural materials used is more than 20%. According to the preferred embodiment, it is preferably to be in a range of between 40% and 100%. While illustrated by using palm oil and its derivatives as raw materials, the palm oil-based polyester resins may contain between 20% and 80% by mass of palm oils or its derivatives in the overall formulation.

After the process of polycondensation, the polyester resins are heated with a vinyl monomer to form a mixture. The addition of a vinyl monomer is especially required when the polyester resins formed contain 5% to 20% of alkenyl (C=C) group. Vinyl monomer is added as an active diluent to regulate the crosslinking process. Any reactive and compatible vinyl monomer can be employed. According to the preferred embodiment, the vinyl monomers are selected from the group consisting of styrene, methyl methacrylate, acrylic acid, butyl acrylate and any combination thereof. In the present invention, it is preferably to be styrene owing to its lower cost and easier reaction. The vinyl monomer will polymerize together with the alkenyl group of the polyester in the reaction mixture during the heating process, initiated with a suitable radical initiator.

The polyester toner resins are synthesized with a broad molecular weight distribution of $M_n$ between 300 and 5500. The initial polyester resin is a viscous liquid or a soft stretchable resinous product. They carry some reactive functional groups such as alkenyl (C=C) group, hydroxyl (—OH) group and carboxylic (—COOH) group. These groups provide the sites for further controllable crosslinking reactions. Through suitable crosslinking processes using suitable agents, approximately 5% to 45% of higher molecular weight fraction could be generated. In the present invention, the palm oil-based polyester resins could achieve a balance of low and high molecular weight fractions, which can provide the fixing and offset properties required as toner resins.

In the present invention, the initially viscous liquid or soft form of the polyester resins can be subjected to crosslinking reactions in a number of methods. The method of crosslinking is generally determined by the type and amount of available reactive sites on the structure of the polyester resins. A crosslinking reaction would form a permanent chemical bonding between the polymer chains, and effectively results in a new material of higher molecular weight. Physical properties would change through these crosslinking reactions. The material with molecular weight of 5000 could appear to be a viscous liquid, but would become a solid when the molecular weight is increased to 50,000 through the crosslinking reaction.

In transforming the initially low molecular weight polyester to a solid with desired properties of toner resin, the required amount of crosslinking reactions is dependent on the initial mean molecular weight. Polyester with lower initial molecular weight would required more crosslinking than one with higher initial molecular weight.

Polyester resins with unsaturated alkenyl (C=C) group on either the main chains or side-chains can be easily crosslinked by free radical reactions, which could be initiated by suitable radical initiator such as organic peroxides or azo-compounds. In the present invention, the cross-linking agents applied are selected from the group consisting of benzoyl peroxide, dialkyl peroxides, hydrogen peroxides, di-tert-butylperoxide, methyl ethyl ketone peroxide, azo-bisisobutyronitrile (AIBN) and azo-biscyclohexanecarbonitrile (ABCN). According to the preferred embodiment, the crosslinking agent is preferably to be benzoyl peroxide.

The crosslinking agent is dissolved in solvent selected from the group consisting of toluene, xylene, ethyl acetate, butyl acetate, methyl ethyl ketone and cyclohexanone. An important criteria for the selection of solvent is its ability to dissolve the initial polyester. According to the preferred embodiment, the cross-linking agent is preferably to be dissolved in toluene.

The extent of crosslinking reaction has to be carefully regulated in order to achieve the desired properties useable as toner resins. Preferably, the initial low molecular weight mixture which contains polyester resins and the vinyl monomers, is treated with appropriate amount of crosslinking reagent. The mixture is allowed to crosslink lightly until the mean molecular weight increases from a range between 300 and 1000 to a range of between 3000 to 15000. At this stage the product is a very viscous liquid at temperature of approximately 100° C. This product could solidify to a non-sticky mass at room temperature which is approximately 28° C.

One of the embodiment of the present invention is to produce two fractions of the polyester toner resins during the crosslinking reaction. According to the preferred embodiment, a first fraction of the polyester resins having molecular weight of between 3000 to 15000 which is to constitute approximately 60% to 80% of the final product, will be separated off from the reaction mixture. The remaining 20% to 40% of the product in the reaction mixture is further treated with a second dose of crosslinking agents, so that the mean molecular weight could be very much higher than 15000, preferably higher than 30000. According to the preferred embodiment, the molecular weight of the second fraction is preferably to in a range of between 30000 and 80000. However, it should not be too high so as to avoid any difficulty in the final processing to form toner resins. The second fraction may have a higher melting point of above 150° C. It provides the desired offset properties of polyester toner resins.

The final step in the synthesis process of polyester toner resins is to combine the lower molecular weight fraction with the higher molecular weight fraction to produce the desired polyester toner resins.

The polyester toner resin can be separated from the diluent which the crosslinking agents dissolved therein by a number of ways. For example, the toluene can be distilled off under reduced pressure. Alternatively, methanol can be added into the solution to precipitate out the resins. The resins are then dried in an oven at approximately 110° C. According to the preferred embodiment, the methanol and toluene can be separated out and reused in the next reaction.

In another preferred embodiment, the present invention discloses a method of synthesizing polyester toner resins comprises: a) polycondensing polycarboxylic acids, polyols and free fatty acids to form polyester resins with hydroxyl group; wherein at least one of said polycarboxylic acids, said polyols or said free fatty acids derive from natural oils; b) crosslinking first portion of said polyester resins with diisocyanate compounds to obtain a first fraction with a molecular weight ranged between 3000 and 15000; c) crosslinking second portion of said polyester resins with a higher dose of diisocyanate compounds to obtain a second fraction with a molecular weight greater than 15000; and d) combining said first fraction with said second fraction to form said polyester toner resins.

According to the preferred embodiment, the polycondesation of a polycarboxylic acid and a polyol will produce polyester resins with hydroxyl (—OH) group either along the main polymer chain or its side-branches. Therefore, a different method of crosslinking process is employed. For example, polyester resins with hydroxyl (—OH) sites can be easily crosslinked by using a diisocyanate compound such as methylene diphenyl diisocyanate (MDI), toluene diisocyanate (TDI) or hexamethylene diisocyanate (HDI). This reaction can readily occur at moderate temperature in a range of between 28° C. and 80° C.

This reaction can readily occur at moderate temperature in a range of between 28° C. and 80° C. The diisocyanate compound used can be methylene diphenyl diisocyanate (MDI), toluene diisocyanate (TDI) or hexamethylene diisocyanate (HDI), preferable MDI because of its reactivity, low volatility, ready availability and lower cost.

The reaction involved can be represented as:

$$nO{=}C{=}N{-}R{-}N{=}C{=}O+nHO{-}CH_2{-}R'{-}CH_2{-}OH \rightarrow O{=}C{=}N{-}[{-}R{-}NH{-}COO{-}CH_2R'{-}CH_2]_n{-}OH$$ (formation of a urethane linkage)

A portion of said polyester resins is crosslink with diisocyanate compounds to obtain a first fraction with a molecular weight ranged between 3000 and 15000. Another portion of said polyester resins is crosslinked with a higher dose of diisocyanate compounds to obtain a second fraction with a molecular weight greater than 15000. The said first fraction and the said second fraction is combined to form said polyester toner resins.

Alternatively, polyester with many hydroxyl (—OH) groups can also be crosslinked by a dicarboxylic acid. Generally, this reaction would require high temperature to occur, which is in a range of between 180° C. to 220° C.

The reaction involved can be represented as:

$$nHOOC{-}R{-}COOH+nHO{-}CH_2{-}R'{-}CH_2{-}OH \rightarrow HOOC{-}[{-}R{-}COO{-}CH_2R'{-}CH_2{-}]_n{-}OH+(2n-1)H_2O$$ (formation of ester linkages)

The extent of these crosslinking reactions are also carefully regulated in order to achieve the desired properties useable as toner resin. Preferably, a portion of the initial low molecular weight polyester resins, which is approximately 60% to 80% of the product are treated with appropriate amount of dicarboxylic acid. The mixture is allowed to crosslink lightly until the mean molecular weight increases from a range between 300 and 1000 to a range of between 3000 and 15000 to form the first fraction of the polyester resin mixture.

At this stage, the product is a very viscous liquid at temperature of approximately 100° C. This product could solidify to a non-sticky mass at room temperature which is approximately 28° C.

The remaining portion of the initial low molecular weight polyester resins which is approximately 20% to 40% of the product is treated with a higher dose of dicarboxylic acid so that the mean molecular weight could be very much higher than 15000, preferably higher than 30000. According to the preferred embodiment, the molecular weight of the second fraction is preferably to be in a range of between 30000 and 60000. The second fraction may have a higher melting point of above 150° C. It provides the desired offset properties of polyester toner resins. The final step in the synthesis process of polyester toner resins is to combine the lower molecular weight fraction with the higher molecular weight fraction to produce the desired polyester toner resins.

One skilled in the art shall appreciate the fact that the polycondesation of a polycarboxylic acid and a polyol will produce polyester resins with a combination of alkenyl (—C═C—) group and hydroxyl (—OH) group either along the main polymer chain or its side-branches. Therefore, either one of the crosslinking processes can be employed, or a combination of the processes can also be applicable. In other words, the alkenyl (—C═C—) sites of polyester resins can be crosslinked by free radicals while hydroxyl (—OH) sites can be crosslinked by using a diisocyanate compound.

Still another embodiment of the present invention is polyester toner resins synthesized by any of the methods described above. In view of the requirements to environmental protection regulations in many countries, the toner industries worldwide are looking for replacements of petroleum-based chemicals with more environmental friendly materials, preferable made from sustainable resources. Therefore, the environmental friendly natural oil-based toner resins of the present invention have many advantages over the traditional toners. Since they are made of mostly natural materials, they are having lower impact to the environment.

The present invention will now be described in greater detail with reference to the following examples. The following examples are for illustrative purpose only and are not intended to limit the scope of the invention.

EXAMPLES

The methods described above can be successfully carried out to produce four examples of polyester resins as listed in Table 1. These four examples of polyester resins are obtained by the polycondensation reactions between different polycarboxylic acids, polyols and free fatty acids derive from palm oil. The hydroxyl value is determined by standard test method such as ASTM D4274-94, whereas $M_n$ is determined by vapor pressure osmometer.

Example 1 shows the polycondensation reaction of the present invention, Example 2 and Example 3 are the different methods of crosslinking reaction as set forth in the foregoing description of the present invention.

TABLE 1

| | PES1 | PES2 | PES3 | PES4 |
|---|---|---|---|---|
| Composition/parts/% | | | | |
| Palm olein | 0.0 | 0.0 | 0.0 | 0.0 |
| Palm kernel oil | 0.0 | 27.2 | 0.0 | 73.5 |
| Oleic acid | 65.1 | 0.0 | 76.6 | 0.0 |
| Adipic acid | 0.0 | 43.0 | 0.0 | 0.0 |
| Phthalic anhydride | 19.5 | 0.0 | 11.4 | 0.0 |
| Fumaric acid | 0.0 | 0.0 | 0.0 | 8.8 |
| Maleic anhydride | 0.0 | 0.0 | 0.0 | 0.0 |
| Ethylene glycol | 0.0 | 0.0 | 7.7 | 0.0 |
| Glycerol | 15.4 | 29.8 | 4.3 | 17.7 |
| % natural material | 80.0 | 57.0 | 80.9 | 100.0 |
| Properties | | | | |
| Apperance | liquid | liquid | liquid | liquid |
| Hydroxyl value | 140.0 | 80.3 | 43.0 | 180.0 |
| Mean mol wt, $M_n$ | 1200 | 4100 | 3290 | 840 |

Example 1

The typical procedure of the polycondensation is illustrated from the synthesis of polyester PES2 of Table 1. 27.2% by weight of palm kernel oil is mixed with 29.8% by weight of glycerol in a reactor. Approximately 0.05% to 0.1% of an alkali compound such as potassium hydroxide can be optionally added as catalyst. The mixture is purged with nitrogen gas, stirred with a mechanical stirrer, and heated to raise the temperature gradually. At temperature of above 120° C., the mixture would appear turbid. Heating is continued until the temperature reaches 180° C. to 210° C. and is maintained for about 2 hours, until fumy vapor is observed. The mixture would turn from turbid to a clearer appearance. The heating is stopped, and the mixture is allowed to cool down slowly until around 100-120° C. Adipic acid is than added in an amount of 43% by weight, and heating is resumed, with the stirrer set at moderate stirring rate of 200 rpm to 300 rpm. The water of reaction would evolve at a fast rate as the temperature reach 180° C. to 210° C. As the reaction approaches completion, the water of reaction would stop to form. The reaction can also be monitored by measuring the acid number of the reaction mixture.

Example 2

With reference to Table 1 above, the 100% natural polyester PES4 that contains C═C double bonds can be reacted with styrene monomer using a free radicals initiator. Thus, 200 g of polyester PES3 is mixed with 450 g of styrene monomer and the mixture is heated to 80-100° C. in a glass reactor. A 200 g solution containing 10% of benzoyl peroxide dissolved in toluene is then added into the reactor gradually and stirred with mechanical stirrer set between 100 rpm to 250 rpm. The total content in the reactor is approximately 850 g. As the reaction proceeded, the viscosity will increase and can be observed visually. After 3 hours of reaction, approximately 50% to 70% of the content in the flask is transferred into a separate container. The remaining 50% to 30% of the product in the reactor is treated with another dose of 5 g benzoyl peroxide dissolved in 50 ml of toluene. The mixture is allowed to react for another 2 hours at 90° C. The two fractions are then combined, and the final polymer is precipitated from the toluene solution by addition of methanol. The polymer is then separated and dried in an oven at 110° C. The filtrate contains predominantly toluene and methanol should be collected and distilled to separate the methanol and toluene, which could be reused.

Example 3

PES1 contain excess of —OH group, and can be conveniently crosslinked by polyisocyanate such as MDI or TDI. For example, one portion of 400 g PES1 can be reacted with 80 g of MDI to generate a fraction of polyester with average molecular weight around 3600. A second portion of 200 g PES1 can be reacted with 120 g of MDI to generate a higher molecular weight fraction of molecular weight around 12000. The two fractions are then combined to produce the toner resin with both fixing and offset properties.

The invention claimed is:

1. A method of synthesizing polyester toner resins comprises:

a) polycondensing polycarboxylic acids, polyols and free fatty acids to form polyester resins with alkenyl group; wherein at least one of said polycarboxylic acids, said polyols or said free fatty acids derive from natural oils;

b) mixing said polyester resins with vinyl monomers to form a mixture;

c) crosslinking said mixture with crosslinking agents to obtain a first fraction with a molecular weight ranged between 3000 and 15000;

d) crosslinking said mixture with a second dose of crosslinking agents to obtain a second fraction with a molecular weight larger than 15000; and e) combining said first fraction with said second fraction to form said polyester toner resins.

2. A method according to claim 1, wherein said polyester toner resins are precipitated from said mixture by methanol after said combining step.

3. A method according to claim 1, wherein said polycarboxylic acids are selected from the group consisting of azelaic acid, citric acid, fumaric acid, maleic anhydride and any combination thereof.

4. A method according to claim 1, wherein said polyols are selected from the group consisting of glycerol, ethylene glycol, 1,4-butandiol and any combination thereof.

5. A method according to claim 1, wherein said free fatty acids are selected from the group consisting of capric acid, lauric acid, oleic acid, palmitic acid, stearic acid, linoleic acid, linolenic acid and any combination thereof.

6. A method according to claim 1, wherein said natural oils are vegetable oils and their derivatives selected from the group consisting of palm oil, coconut oil, soy oil, linseed oil, castor oil, rapeseed oil and any combination thereof.

7. A method according to claim 1, wherein said natural oils are animal fats and their derivatives selected from the group consisting of tallow oil, fish oil and any combination thereof.

8. A method according to claim 1, wherein said vinyl monomers are selected from the group consisting of styrene, methyl methacrylate, acrylic, butyl acrylate and any combination thereof.

9. A method according to claim 1, wherein said crosslinking agents are selected from the group consisting of organic peroxides and azo-compounds.

10. A method of synthesizing polyester toner resins comprises:

a) polycondensing polycarboxylic acids, polyols and free fatty acids to form polyester resins with hydroxyl group; wherein at least one of said polycarboxylic acids, said polyols or said free fatty acids derive from natural oils;

b) crosslinking first portion of said polyester resins with diisocyanate compounds to obtain a first fraction with a molecular weight ranged between 3000 and 15000;

c) crosslinking second portion of said polyester resins with a higher dose of diisocyanate compounds to obtain a second fraction with a molecular weight greater than 15000; and d) combining said first fraction with said second fraction to form said polyester toner resins.

11. A method according to claim 10, wherein said polyester toner resins are precipitated from said mixture by methanol after said combining step.

12. A method according to claim 10, wherein said polycarboxylic acids are selected from the group consisting of azelaic acid, citric acid, fumaric acid, maleic anhydride and any combination thereof.

13. A method according to claim 10, wherein said polyols are selected from the group consisting of glycerol, ethylene glycol, 1,4-butandiol and any combination thereof.

14. A method according to claim 10, wherein said free fatty acids are selected from the group consisting of capric acid, lauric acid, oleic acid, palmitic acid, stearic acid, linoleic acid, linolenic acid and any combination thereof.

15. A method according to claim 10, wherein said natural oils are vegetable oils and their derivatives selected from the group consisting of palm oil, coconut oil, soy oil, linseed oil, castor oil and any combination thereof.

16. A method according to claim 10, wherein said natural oils are animal fats and their derivatives selected from the group consisting of tallow oil, fish oil and any combination thereof.

17. A method according to claim 10, wherein said diisocyanate compounds are selected from the group consisting of methyl diphenyl diisocyanate (MDI), toluene diisocyanate (TDI), hexamethylene diisocyanate (HDI) and any combination thereof.

18. Polyester toner resins synthesized by any one of claims 1-17.

* * * * *